United States Patent [19]

Reuter et al.

[11] Patent Number: 5,198,525

[45] Date of Patent: Mar. 30, 1993

[54] AROMATIC COPOLYETHER SULFONES

[75] Inventors: Knud Reuter, Krefeld; Wolfgang Jilge, Bergisch-Gladbach; Bernd Pittel, Heinsberg; Günther Weymans, Leverkusen, all of Fed. Rep. of Germany

[73] Assignee: Bayer Aktiengesellschaft, Leverkusen-Bayerwerk, Fed. Rep. of Germany

[21] Appl. No.: 525,953

[22] Filed: May 21, 1990

[30] Foreign Application Priority Data

May 31, 1989 [DE] Fed. Rep. of Germany ....... 3917648

[51] Int. Cl.$^5$ .................. C08C 75/23; C08C 8/02; C08C 65/40
[52] U.S. Cl. .................. 528/171; 528/125; 528/126; 528/128; 528/174; 528/175; 528/219; 528/220; 528/226
[58] Field of Search ................ 528/125, 126, 127, 128, 528/171, 174, 175, 220, 226, 219

[56] References Cited

U.S. PATENT DOCUMENTS

| | | | |
|---|---|---|---|
| 3,036,037 | 5/1962 | Howe | 528/171 |
| 3,524,833 | 8/1970 | Darms | 528/171 |
| 3,761,449 | 9/1973 | Kaufman | 528/174 |
| 3,784,504 | 1/1974 | Feasey | 528/174 |
| 4,110,314 | 8/1978 | Yagi et al. | 528/125 |
| 4,503,168 | 3/1985 | Hartsing, Jr. | 528/125 |
| 4,775,738 | 10/1988 | Mayska et al. | 528/171 |
| 4,814,419 | 3/1989 | Cotter et al. | 528/171 |
| 4,816,505 | 3/1989 | Cotter et al. | 528/171 |
| 4,820,790 | 4/1989 | Winslow et al. | 528/125 |
| 4,829,143 | 5/1989 | Clendinning et al. | 528/125 |
| 4,939,228 | 7/1990 | Robeson et al. | 528/128 |
| 4,964,890 | 10/1990 | Reuter et al. | 528/125 |
| 5,021,542 | 6/1991 | Serini et al. | 528/171 |
| 5,086,157 | 2/1992 | Reuter et al. | 528/171 |
| 5,086,159 | 2/1992 | Fritsch et al. | 528/171 |

FOREIGN PATENT DOCUMENTS

| | | |
|---|---|---|
| 0135938 | 4/1985 | European Pat. Off. |
| 0362603 | 4/1990 | European Pat. Off. |
| 3832396 | 2/1990 | Fed. Rep. of Germany |
| 1078234 | 9/1967 | United Kingdom |
| 1122003 | 7/1968 | United Kingdom |
| 1229482 | 4/1971 | United Kingdom |
| 1367788 | 9/1974 | United Kingdom |
| 1367790 | 9/1974 | United Kingdom |

OTHER PUBLICATIONS

Polymer Science USSR vol. 14, "Aromatic Polyethers of the 'Cardic' Type", pp. 2962-2970 (1972).

Primary Examiner—John Kight, III
Assistant Examiner—P. Hampton-Hightower
Attorney, Agent, or Firm—Connolly & Hutz

[57] ABSTRACT

Aromatic polyether sulfones based on 5 to 90 mol-%, based on total bisphenols, of special dihydroxydiphenyl cycloalkanes and 10 to 95 mol-% based on the bisphenols of specific phthaleins, a process for their production and their use as molding compounds.

5 Claims, No Drawings

AROMATIC COPOLYETHER SULFONES

This invention relates to aromatic polyether sulfones (and to a process for their production) based on 5 to 90 mol-%, based on the total quantity of all bisphenols, of dihydroxydiphenyl cycloalkanes corresponding to formula (I)

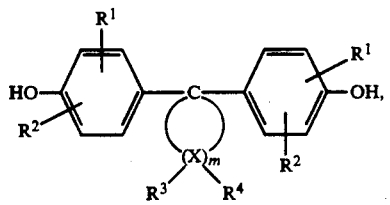

(I)

in which $R^1$ and $R^2$ independently of one another represent hydrogen, halogen, preferably chlorine or bromine, $C_{1-8}$ alkyl, $C_{5-6}$ cycloalkyl, $C_{6-10}$ aryl, preferably phenyl, and $C_{7-12}$ aralkyl, preferably phenyl-$C_{1-4}$-alkyl, more especially benzyl and cumyl, m is an integer of from 4 to 7, preferably 4 or 5, $R^3$ and $R^4$ may be individually selected for each X and independently of one another represent hydrogen or $C_{1-6}$ alkyl and X represents carbon, with the proviso that, at at least one atom X, both $R^3$ and $R^4$ are alkyl, and 10 to 95 mol-% phthaleins based on the total quantity of the bisphenols corresponding to formula (II)

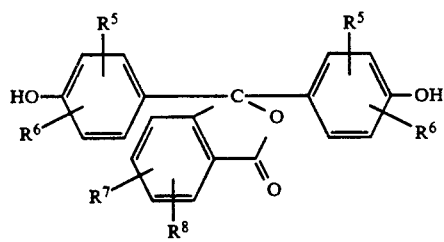

(II)

in which $R^5$ to $R^6$ have the meanings defined above for $R^1$ and $R^2$ (but independently of $R^1$ and $R^2$).

Preferably at 1 to 2 atoms X and, more particularly, at only 1 atom X, both $R^3$ and $R^4$ in formula (I) are alkyl. The preferred alkyl radical is methyl. The X atoms in the α-position to the diphenyl-substituted C atom (C-1) are preferably not dialkyl-substituted, whereas the X atoms in the β-position to C-1 are preferably dialkyl-substituted. In formula (II), $R^7$ and $R^8$ are preferably hydrogen.

Particularly preferred starting materials corresponding to formula (I) are dihydroxydiphenyl cycloalkanes containing 5 and 6 ring C atoms in the cycloaliphatic radical (m=4 or 5 in formula (I)), for example diphenols corresponding to the following formulae

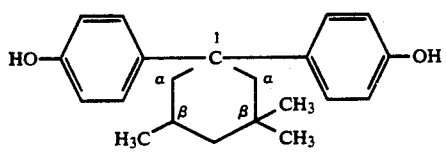

(III)

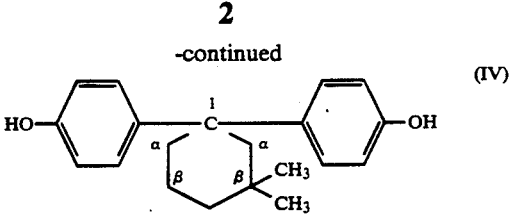

the 1,1-bis-(4hydroxyphenyl)-3,3,5-trimethyl cyclohexane (formula III) being particularly preferred. The particularly preferred starting material of formula (II) is phenolphthalein ($R^5$-$R^6$=hydrogen).

The dihydroxydiphenyl cycloalkanes corresponding to formula (I) may be obtained in known manner by condensation of phenols corresponding to formula (VI)

(VI)

and ketones corresponding to formula (VII)

(VII)

where X, $R^1$, $R^2$, $R^3$, $R^4$ and m are as defined for formula (I).

The phenols corresponding to formula (VI) are either known or may be obtained by known methods (see for example Ullmanns Encyklopädie der technischen Chemie, 4th Edition, Vol. 15, pages 61-77).

Examples of suitable phenols corresponding to formula (VI) are phenol, o-cresol, m-cresol, 2,6-dimethylphenol, 2-chlorophenol, 3-chlorophenol, 2,6-dichlorophenol, 2-cyclohexylphenol, o-phenylphenol and o- or p-benzylphenol.

The ketones corresponding to formula (VII) are known (cf. for example Beilsteins Handbuch der Organischen Chemie, 4th Edition, Vol. 7). A general process for the production of ketones corresponding to formula (VII) is described, for example in "Organikum", 15th Edition, 1977, VEB-Deutscher Verlag der Wissenschaften, Berlin, page 698.

Examples of ketones of formula (VII) are 3,3-dimethylcyclohexanone, 4,4-dimethylcyclohexanone, 3-ethyl-3-methylcyclopentanone, 2,3,3-trimethylcyclopentanone, 2,4,4-trimethylcyclopentanone, 3,3,4-trimethylcyclopentanone, 3,3-dimethylcycloheptanone 4,4-dimethylcycloheptanone, 3-ethyl-3-methylcyclohexanone, 4-ethyl-4-methylcyclohexanone, 2,3,3-trimethylcyclohexanone, 2,4,4-trimethylcyclohexanone, 3,3,4-trimethylcyclohexanone, 2,5,5-trimethylcyclohexanone, 3,3,5-trimethylcyclohexanone. 3,4,4-trimethylcyclohexanone, 2,3,3,4-tetramethylcyclopentanone, 2,3,4,4-tetramethylcyclopentanone, 3,3,4,4-tetramethylcyclopentanone, 2,2,5-trimethylcycloheptanone, 2,2,6-trimethylcycloheptanone, 2,6,6-trimethylcycloheptanone, 3,3,5-trimethylcycloheptanone, 3,5,5-trimethylcycloheptanone,5-ethyl-2,5-dimethylcycloheptanone, 2,3,3,5-tetramethylcycloheptanone, 2,3,5,5-tetramethylcycloheptanone, 3,3,5,5-tetramethylcycloheptanone, 4-ethyl-2,3,4-trimethylcyclopentanone, 2-isopropyl-4,4-dimethylcyclopentanone, 4-isopropyl-2,4-dimethylcyclopentanone, 2-ethyl-3,5,5-trimethylcyclohexanone, 3-ethyl-3,5,5,-trimethylcyclohexanone, 3-ethyl-4-isopropyl-3-methylcyclopentanone, 4-sec.-butyl-3,3-dimethylcyclopentanone, 2-isopropyl-3,3,4-trimethylcyclopentanone, 3-ethyl-4-isopropyl-3-methyl-cyclohexanone, 4-ethyl-3-isopropyl-4-methylcyclohexanone, 3-sec.-butyl-4,4-dimethylcyclohexanone, 3-isopropyl-3,5 5-trimethylcyclohexanone 4-isopropyl-3,5,5-trimethylcyclohexanone, 3,3,5-trimethyl-5-propylcyclohexanone, 3,5,5-trimethyl-5-propylcyclohexanone, 2-butyl-3,3,4-trimethylcyclopentanone, 2-butyl-3,3,4-trimethylcyclohexanone, 4-butyl-3,3,5-trimethylcyclohexanone, 3-isohexyl-3-methylcyclohexanone, 5-ethyl-2,4-diisopropyl-5-methylcyclohexanone, 2,2-dimethylcyclooctanone and 3,3,8-trimethylcyclooctanone.

The following are examples of preferred ketones of formula (VII)

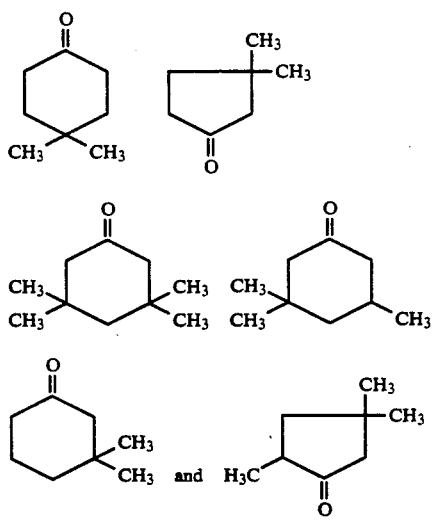

To prepare the bisphenols, the phenol of formula (VI) is generally used in a quantity of 2 to 10 mol and preferably in a quantity of 2.5 to 6 mol per mol ketone of formula (VII). Preferred reaction times are from 1 to 100 hours. The reaction is generally carried out at a temperature in the range from $-30°$ C. to $300°$ C. and preferably at a temperature in the range from $-15°$ C. to $150°$ C. and under a pressure of from 1 to 20 bar and preferably under a pressure of from 1 to 10 bar.

The condensation is generally carried out in the presence of acidic catalysts such as, for example, hydrogen chloride, hydrogen bromide, hydrogen fluoride, boron trifluoride, aluminium trichloride, zinc dichloride, titanium tetrachloride, tin tetrachloride, phosphorus halides, phosphorus pentoxide, phosphoric acid, concentrated hydrochloric acid or sulfuric acid and also mixtures of acetic acid and acetanhydride. Acidic ion exchangers may also be used.

The reaction may be accelerated by addition of co-catalysts, such as $C_1-C_{18}$ alkyl mercaptans, hydrogen sulfide, thiophenols, thio acids and dialkyl sulfides.

The condensation may be carried out in the absence of solvents or in the presence of an inert solvent (for example an aliphatic or aromatic hydrocarbon, chlorinated hydrocarbon).

In cases where the catalyst also acts as a dehydrating agent, there is no need to use separate dehydrating agents, although, to obtain good conversions, it is always of advantage to use dehydrating agents when the catalyst used does not bind the water of reaction.

Suitable dehydrating agents are, for example, acetanhydride, zeolites, polyphosphoric acid and phosphorus pentoxide.

The production of the diphenols corresponding to formula (I) is described in German Offenlegungsschrift 38 32 396.6 and is illustrated by Example 1.

The phthaleins corresponding to formula (II) are known, for example from Ullmann's Encyclopädie der techn. Chemie, 3rd Edition (1957), Vol. 8, pages 766-767. They may be prepared, for example, in accordance with U.S. Pat. No. 2,522,940 or Z. anorg. allgem. Chem. 178, page 49 et seq. (1929).

suitable phthaleins of formula (II) are, for example, phenolphthalein, the different isomeric cresolphthaleins, xylenolphthaleins, thymolphthaleins. Phenolphthalein is preferred.

The present invention relates to aromatic polyether sulfones containing the following recurring structural unit:

in which —E'— is a two-bond group of an aromatic ketone corresponding to formula (IXa)

in which

Ar and Ar' are the same or different and represent bivalent aromatic radicals containing from 6 to 50 carbon atoms and in which

is a bivalent diphenolate residue, characterized in that from 5 to 90 mol-%, preferably from 20 to 80 mol-% and, more preferably, from 30 to 75 mol-% of the diphenolate residues of the formula (Xa) are those corresponding to formula (Ia)

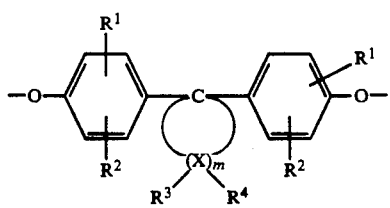

(Ia)

in which X, $R^1$, $R^2$, $R^3$, $R^4$ and m are as defined in formula (I) and in that from 10 to 95 mol-%, preferably from 20 to 80 mol-% and more preferably from 25 to 70 mol-% of the diphenolate residues of the formula (Xa) correspond to formula (IIa)

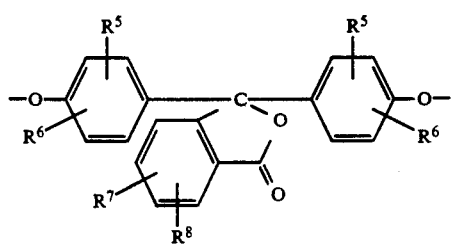

(IIa)

in which $R^5$, $R^6$, $R^7$ and $R^8$ are as defined in formula (II).

The aromatic polyether sulfones according to the invention preferably have average molecular weights $\overline{M}_w$ (weight average) in the range from 1,000 to 500,000, preferably in the range from 3,000 to 200,000 and more preferably in the range from 5,000 to 100,000.

Aromatic polyether sulfones are known (cf. for example GB-P 1,078,234, U.S. Pat No. 4,010,147 and EP-A 0 135 938). They may be prepared, for example, by reaction of dialkali salts of diphenols with dihalodiaryl sulfones in a polar solvent (cf. for example GB-P 1,078,234); the dialkali salts of the diphenols may also be produced in situ.

The polyether sulfones according to the invention may also be prepared by this method, the polar solvent used preferably being caprolactam $C_{1-5}$-alkyl-substituted at the nitrogen, such as N-methyl caprolactam, N-ethyl caprolactam, N-n-propyl caprolactam, N-isopropyl caprolactam, preferably N-methyl caprolactam, and pyrrolidones $C_{1-5}$-alkyl-substituted at the nitrogen, such as N-methyl pyrrolidone, N,N-dimethyl formamide, N,N-dimethyl acetamide, dimethyl sulfoxide, diphenyl sulfone, sulfolan and tetramethyl urea. Other less polar solvents, for example aromatic hydrocarbons, such as toluene, xylene, mesitylene, chlorobenzene, or aliphatic hydrocarbons, such as gasolines, cyclohexane, may be used in part, for example in quantities of 0.1 to 200% by weight, based on the weight of the polar solvent.

The present invention also relates to a process for the production of the polyether sulfones according to the invention containing the repeating structural unit (VIII) by reaction of dialkali diphenolates of the formula (Xb)

Alkali—O—E—O—Alkali          (Xb)

with dihalodiaryl sulfones of the formula (IX)

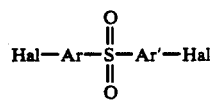

(IX)

in which Ar and Ar' may be the same or different and represent bivalent aromatic radicals containing from 6 to 50 carbon atoms and Hal represents halogen, such as fluorine, chlorine and bromine,
in solvents, characterized in that (based in each case on the total quantity of all the bisphenols used) from 5 to 90 mol-%, preferably from 20 to 80 mol-% and, more preferably from 30 to 75 mol-% of the dialkali diphenolates of formula (Xb) correspond to formula (Ib)

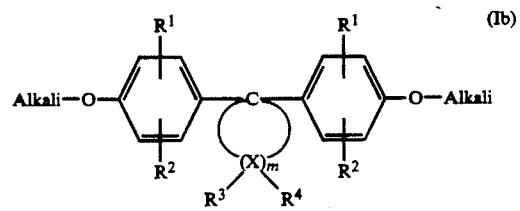

(Ib)

in which X, $R^1$, $R^2$, $R^3$, $R^4$ and m are as defined for formula (I), and in that from 10 to 95 mol-%, preferably from 20 to 80 mol-% and more preferably from 25 to 70 mol-% of the dialkali phenolates (Xb) correspond to formula (IIb)

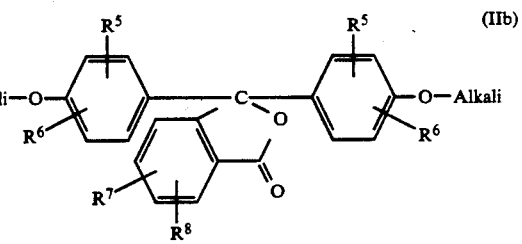

(IIb)

wherein $R^5$ to $R^8$ have the meanings defined for $R^1$ and $R^2$ but are independent of $R^1$ and $R^2$, and in that the reaction is carried out in a polar solvent, such as N-alkylated caprolactams or N-alkylated pyrrolidones, being used.

In addition to the diphenolate residues corresponding to formulae (Ia) and IIa), the polyether sulfones according to the invention may also contain diphenolate residues derived from other diphenols corresponding to the formula HO—E—OH (X) in a quantity of from 0 to 85 mol-%, preferably in a quantity of from 0 to 60 mol-% and more preferably in a quantity of from 0 to 45 mol-% of all the diphenolate residues. (These quantities are derived from the necessary minimum quantities of diphenolate residues corresponding to formulae Ia and IIa).

Formulae (X), (Xa) and (Xb) represent the diphenol, the diphenolate residue derived therefrom and the corresponding dialkali salt.

Suitable other diphenols corresponding to formula (X) are, for example, hydroquinone, resorcinol, dihydroxydiphenyls, bis-(hydroxyphenyl)-alkanes, bis-(hydroxyphenyl)cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, α,α'-bis(hydroxyphenyl)-diisopropylbenzenes and nucleus-alkylated and nucleus halogenated compunds thereof.

These and other suitable other diphenols (X) are described, for example, in U.S. Pat. Nos. 3,028,365, 2,999,835, 3,148,172, 3,275,601, 2,991,273, 3,271,367, 3,062,781, 2,970,131 and 2,999,846; in DE-OS 1 570 703, 2 063 050, 2 063 052 2 211 0956, in FR-P 1 561 518 and in the book by H. Schnell entitled "Chemistry and Physics of Polycarbonates", Interscience Publishers, New York, 1964.

Preferred other diphenols (X) are, for example, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane,α, α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-cyclohexane, α, α'-bis-(3,5-dimethyl-4-hydroxyphenyl)-p-diisopropylbenzene, 2,2-bis-(3,5-dichloro-4-hydroxyphenyl)propane, 2,2-bis-(3,5-dibromo-4-hydroxyphenyl)-propane and 4,4'-dihydroxydiphenyl sulfone.

Particularly preferred other diphenols are, for example, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 4,4'-dihydroxydiphenyl sulfone.

They may be used individually or in admixture.

Suitable dihalodiaryl sulfones (IX) are 4,4'-dichlorodiphenyl sulfone,
4,4'-difluorodiphenyl sulfone, 4-chloro-4'-fluorodiphenyl sulfone,
3,3'-dinitro-4,4'-dichlorodiphenyl sulfone,
3,3'-dinitro-4,4'-difluorodiphenyl sulfone,
4,4'-dibromodiphenyl sulfone,

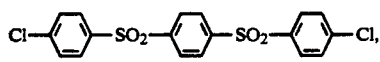

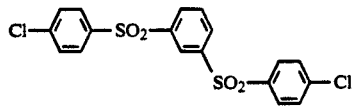

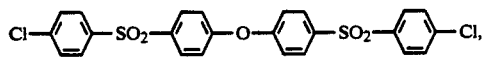

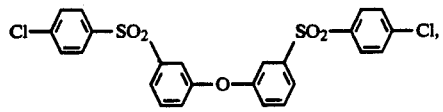

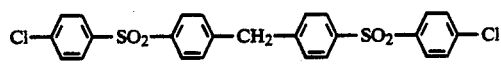

Accordingly, in formula (IX), Ar and Ar' are preferably p-phenylene radicals or alkyl- or nitrosubstituted p-phenylene radicals or radicals corresponding to the following formula

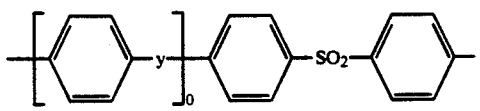

with y=—O—, —CH$_2$—, —SO$_2$—, a single bond and o=0 or 1 and Hal=fluorine, chlorine or bromine.

The alkali in the dialkali phenolates (Ib) and (IIb) and (Xb) is preferably sodium or potassium.

The halogen in the dihalodiaryl sulfones (IX) is fluorine and chlorine and bromine, preferably chlorine.

Preferred polyether sulfones according to the invention are those containing at least 10 mol-% of recurring structural units corresponding to the following formula

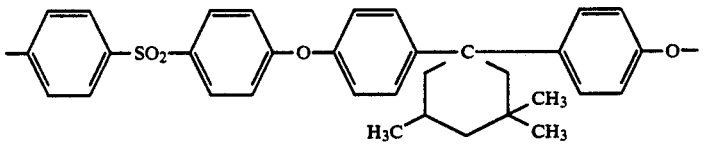

and at least 10 mol-% recurring structural units corresponding to the following formula

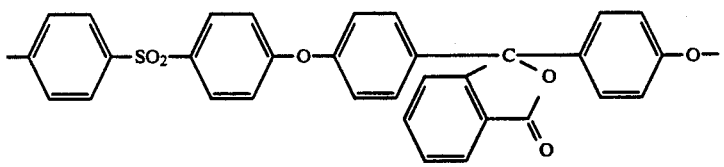

and have a molecular weight $\overline{M}_w$ above 3000 g/mol (weight average).

According to the invention, the aromatic polyether sulfones may be prepared at temperatures in the range from 130° C. to 320° C. and preferably at temperatures in the range from 145° C. to 280° C. under pressures of from 0.8 to 10 bar and preferably under pressures of from 1 to 3 bar, more especially at atmospheric ambient pressure.

The molar quantitative ratio of the alkali diphenolates (Ib),(IIb) and (Xb) to the dihalodiaryl sulfones (IX) is between 0.67 and 2, preferably between 0.8 and 1.2 and more preferably between 0.95 and 1.05, a ratio of 1 or very close to 1 having to be selected for high molecular weights.

The quantity of polar solvents is from 0.5 to 50 parts by weight and preferably from 2 to 20 parts by weight, based on the total weight of the polyether sulfone starting materials.

The polyether sulfones according to the invention may be recovered, for example, as follows from the reaction mixtures obtained:

The reaction mixture is diluted, particularly where highly viscous solutions are present, with the polar reaction solvent for example or with another solvent for the polyether sulfone and filtered. After neutralization of the filtrate with a suitable acid, for example acetic acid, the polyether sulfone is precipitated by pouring into a suitable precipitation medium, for example water or alcohols, such as for example methanol or isopropanol, or ater/alcohol mixtures, for example H₂O/methanol 1:1, isolated and then dried.

The polyether sulfones according to the invention are thermoplastics combining high heat resistance with excellent permeability to gases and superior flame resistance. They may be processed, for example, by extrusion, injection molding, sintering or press molding.

Moldings of any type may be produced. These moldings may be used for any applications requiring polyether sulfones of high dimensional stability, i.e. for example in electrical engineering and electronics (e.g. printed circuit boards) aircraft construction, including air and space travel, for sports equipment, functional components and ovenware for microwave ovens, sterilizable medical instruments, parts of coffee machines, egg boilers, hotwater tanks, pipes and pumps, hair dryers and the like. However, the polyether sulfones according to the invention are particularly suitable for films and membranes which are required to show a combination of high gas permeability, high flame resistance and high thermal and mechanical stability.

Standard additives, such as plasticizers, mold release agents, stabilizers, such as for example UV absorbers or anti-oxidants, intumescence aids (flameproofing agents), reinforcing fibers, such as glass fibers, carbon fibers or aramide fibers, fillers, inorganic and organic pigments, ceramic materials, carbon black, etc., may be added to the polyether sulfones according to the invention, preferably in quantities of from 0 to 80% by weight and more preferably in quantities of from 0 to 60% by weight, based on polyether sulfone=100%, best before the polyether sulfones according to the invention are processed to moldings.

By virtue of their functional terminal groups (halogen or OH), the low molecular weight polyether sulfones according to the invention are particularly suitable for incorporation in block copolymers in conjunction with other cocondensable units.

The polyether sulfones according to the invention may also be mixed in known manner with other known polymers.

In the following Examples, the permeation property was measured as follows:

The passage of a gas through an impervious polymer membrane is described by a dissolving/diffusion process. The characteristic constant for this process is the permeation coefficient P which indicates the gas volume V which passes through a film of known surface area F and thickness d in a certain time t for a given pressure difference ΔP. For the steady state, the following may be deduced from the differential equations of the permeation process:

$$P = \frac{V \cdot d}{F \cdot t \cdot \Delta P} \quad (1)$$

In addition, permeation is dependent on the temperature and water content of the gas.

The measuring arrangement consists of a thermostatically controlled two-chamber system. One chamber is designed to accommodate the test gas and the other to accommodate the permeate. The two chambers are separated by the polymer membrane to be measured.

The two chambers are evacuated to 10⁻³ mbar and the first chamber is filled with gas. The permeated gas then produces an increase in pressure in the permeate chamber (for constant volume), the increase in pressure being quantitatively recorded by a pressure recorder (an MKS Baratron) as a function of time taken to reach the steady state. V is calculated therefrom at NTP. The predetermined pressure difference taking the outside air pressure into account is adjusted in each case to 10,000 Pa. The surface area of the membrane F is known. The membrane thickness d is determined by micrometer gauge as the mean value of ten independent thickness measurements distributed over the membrane surface.

From these values, the permeation coefficient P may be determined in accordance with the following equation:

$$[P] = \frac{cm^3 \cdot mm}{m^2 \cdot 24\,h \cdot 10,000\,Pa}$$

based on a membrane thickness of 1 mm.

Further measurement parameters are:

| Temperature | 25° C. (accuracy 1° C.) |
|---|---|
| Relative gas humidity | 0% |

A qualitative description of the measuring process can be found in EP-A 0 242 147, Example 1 (page 15).

EXAMPLES

1. Preparation of a Bisphenol Corresponding to Formula I

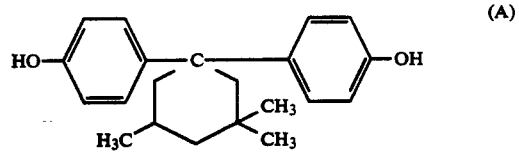

(A)

7.5 mol (705 g) phenol and 0.15 mol (30.3 g) dodecanethiol are introduced into a 1-liter round-bottomed flask equipped with a stirrer, dropping funnel, thermometer, reflux condenser and gas inlet pipe and saturated with dry HCl gas at 28° to 30° C. A mixture of 1.5 mol (210 g) dihydroisophorone and 1.5 mol (151 g) phenol is added dropwise to the resulting solution over a period of 3 hours at 28° to 30° C., HCl gas continuing to be passed through the reaction solution. After the addition, HCl gas is introduced for another 5 hours. The mixture is then left to react for 8 hours at room temperature. The excess phenol is then removed by steam distillation. The residue is hot-extracted twice with petroleum ether (60-90) and once with methylene chloride and filtered off. Yield: corresponding to 79%, 370 g, Mp.: 205°–207° C.

2. Preparation of a Copolyether Sulfone according to the Invention of 40 mol-% Phenolphthalein and 60 mol-% Bisphenol of Formula (A)

18.62 g (0.06 mol) of the bisphenol of formula (A), 12.73 g (0.04 mol) phenolphthalein, 28.73 g 4,4'-dichlorodiphenyl sulfone (0.1 mol), 200 ml N-methyl pyrrolidone, 100 ml toluene and 18 g potassium carbonate are introduced into a nitrogen-purged stirred reactor provided with a water separator. Water is removed by azeotropic distillation until the mixture is water-free. By distilling off toluene, the sump temperature is increased to 180° C. in 1 hour. The mixture is stirred for 4 hours at 180° C. and then heated for 1 hour at 190°–195° C. It is then diluted with 200 ml N-methyl pyrrolidone and hot-filtered under suction. The filtrate is neutralized with acetic acid and the polymer isolated therefrom by precipitation in a mixture of methanol and water (1:1). For further purification, the polymer is dissolved in methylene chloride and then precipitated in methanol. Finally, it is dried in vacuo for 14 hours at 120° C. Yield: 37.0 g; relative viscosity ($\eta_{rel}$), as measured in methylene chloride at 25° C. and at a polymer concentration of 5 g per liter: 1.198; glass temperature, as determined by the DSC method at a heating rate of 20 K/min: 247° C.

| Permeation coefficient P for | $N_2$ | $O_2$ | $CO_2$ |
|---|---|---|---|
| Example 2 | 142 | 963 | 6116 |
| Comparison* | | 330 | 860 |

*Comparison: polyether sulfone of phenolphthalein and 4,4'-dichlorodiphenyl sulfone, $\eta_{rel}$ = 1.354.

3. Preparation of a Copolyether Sulfone according to the Invention of 90 mol-% Phenolphthalein and 10 mol-% Bisphenol of Formula (A)

3.10 g (0.01 mol) of the bisphenol of formula (A), 28.64 g (0.09 mol) phenolphthalein and 28.72 g (0.1 mol) 4,4'-dichlorodiphenyl sulfone are reacted to the polyether sulfone as in Example 2 and the reaction product is worked up in the same way. Yield: 36.2 g; relative viscosity ($\eta_{rel}$), as measured in methylene chloride at 25° C. and at a polymer concentration of 5 g per liter: 1.262; glass temperature, as determined by the DSC method at a heating rate of 20 K/min: 254° C.

| Permeation coefficient P for | $N_2$ | $O_2$ | $CO_2$ |
|---|---|---|---|
| Example 3 | 110 | 707 | 4390 |
| Comparison* | | 330 | 860 |

*Comparison: polyether sulfone of phenolphthalein and 4,4'-dichlorodiphenyl sulfone, $\eta_{rel}$ = 1.354.

4. Preparation of a Copolyether Sulfone according to the Invention of 50 Mol-% Phenolphthalein and 50 Mol-% Bisphenol of Formula (A)

294.9 g (0.95 mol) of the bisphenol of formula (A), 302.4 g (0.95 mol) phenolphthalein, 545.6 g 4,4'-dichlorodiphenyl sulfone (1.9 mol), 3800 ml N-methyl caprolactam, 1900 ml toluene and 342 g potassium carbonate are introduced into a nitrogen-purged stirred reactor provided with a water separator. Water is removed by azeotropic distillation until the mixture is water-free. By distilling off toluene, the sump temperature is increased to 180° C. in 1 hour. The mixture is stirred for 4 hours at 180° C. and then heated within 5 hours up to 230° to 235° C. It is then diluted with 2500 ml N-methyl caprolactam and hot-filtered under suction. The filtrate is neutralized with acetic acid and the polymer isolated therefrom by precipitation in a mixture of methanol and water (1:1). For further purification, the polymer is dissolved in methylene chloride and then precipitated in methanol. Finally, it is dried in vacuo for 14 hours at 120° C. Yield: 794.3 g; relative viscosity ($\eta_{rel}$), as measured in methylene chloride at 25° C. and at a polymer concentration of 5 g per liter: 1.18; glass temperature, as determined by the DSC method at a heating rate of 20K/min: 249° C.

5. Preparation of a Copolyether Sulfone according to the Invention of 80 Mol-% Phenolpthalein, 10 Mol-% Bisphenol of Formula (A) and 10 mol-% Bisphenol A, 2,28 g Bisphenol A (0.01 mol), 3.10 g (0.01 mol) of the-bisphenol of formula (A), 25.46 g (0.08 mol) phenolphthalein and 28.72 g (0.1 mol) 4,4'-dichlorodiphenyl sulfone are reacted to the polyether sulfone as in Example 2 and the reaction product is worked up in the same way. Yield: 35.1 g; relative viscosity ($\eta_{rel}$), as measured in methylene chloride at 25° C. and at a polymer concentration of 5 g per liter: 1.26; glass temperature, as determined by the DSC method at a heating rate of 20K/min: 250° C.

We claim:

1. Aromatic polyether sulfones containing the following recurring structural unit:

$$-O-E-O-E'- \qquad (VIII)$$

in which —E'— is a bivalent residue of an aromatic ketone corresponding to formula (IXa)

(IXa)

in which
Ar and Ar' are the same or different and represent bivalent aromatic radicals containing from 6 to 50 carbon atoms
and in which

$$-O-E'-O- \qquad (Xa)$$

is a bivalent diphenolate residue, wherein from 5 to 90 mol-% of the diphenolate residues of the formula (Xa) are those corresponding to formula (Ia)

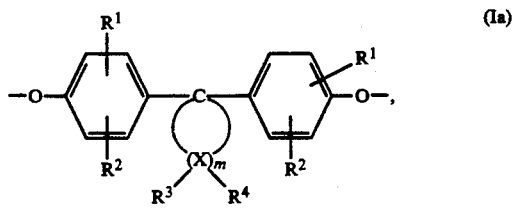

(Ia)

in which
$R^1$ and $R^2$ independently of one another represent hydrogen, halogen, $C_{1-8}$ alkyl, $C_{5-6}$ cycloalkyl, $C_{6-20}$ aryl and $C_{7-12}$ aralkyl,
m is an integer of from 4 to 7, R³ and R⁴ may be individually selected for each X and independently of one another represent hydrogen or $C_{1-6}$ alkyl and X represents carbon, with the proviso that, at at least one atom X, both R³ and R⁴ are alkyl, 10 to 95 mol-% of the diphenolate residues of the formula (Xa) are those corresponding to formula (IIa)

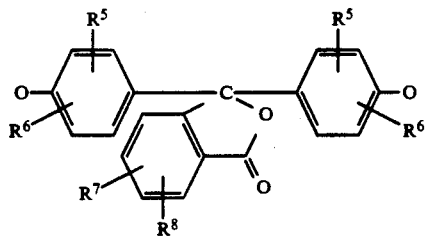

in which R⁵, R⁶, R⁷ and R⁸ have the same meanings as R¹ and R², but are independent of R¹ and R², and 0 to 85 mol-% of the diphenolate residues of the formula (Xa) are residues of other diphenols, 2. Aromatic polyether sulfones as claimed in claim 1 having average molecular weights Mw in the range from 1,000 to 500,000 g/ml.

3. Aromatic polyether sulfones as claimed in claim 1, in which 20 mol-% to 80 mol-% of the diphenolate residues of formula (Xa) are diphenolate residues of formula (Ia), 20 mol-% to 80 mol-% of the diphenolate residues of formula (Xa) are diphenolate residues corresponding to formula (IIa), and 0 to 60 mol-% of the diphenolate residues of the formula (Xa) are residues of other diphenols.

4. Aromatic polyether sulfones as claimed in claim 1, in which 30 mol-% to 75 mol-% of the diphenolate residues of formula (Xa) are diphenolate residues of formula (Ia), 25 mol-% to 70 mol-% of the diphenolate residues of formula (Xa) are diphenolate residues corresponding to formula (IIa), and 0 to 45 mol-% of the diphenolate residues of the formula (Xa) are residues of other diphenols.

5. A process for the production of the polyether sulfones claimed in claim 1 by reaction of dialkali diphenolates of formula (Xb)

Alkali—O—E—O—Alkali   (Xb)

with dihalodiaryl sulfones of the formula (IX)

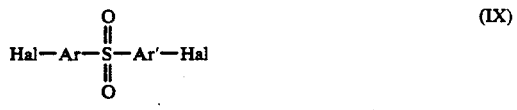

in which Ar and Ar' are the same or different and represent difunctional aromatic radicals containing from 6 to 50 carbon atoms and Hal represents halogen, characterized in that from 5 to 90 mol-% of the dialkali diphenolates of formula (Xb) are those corresponding to formula (Ib)

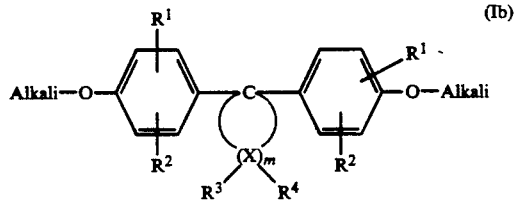

in which X, R¹, R², R³, R⁴ and m are as defined for formula (Ia) in claim 1, and in that from 10 to 95 mol-% of the dialkali phenolates of formula (Xb) are those corresponding to formula (IIb)

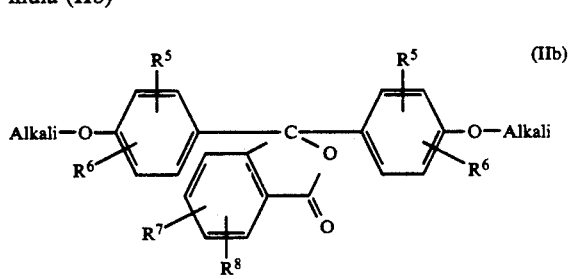

in which R⁵ to R⁸ have the meanings defined for R¹ and R² but are independent of R¹ and R², and in that 0 to 85 mol-% of the diphenolate residues of the formula (Xa) are residues of other diphenols and in that the reaction is carried out in polar solvents.

* * * * *